(12) United States Patent
Kimoto

(10) Patent No.: US 10,200,595 B2
(45) Date of Patent: Feb. 5, 2019

(54) IMAGE CAPTURING APPARATUS, METHOD OF CONTROLLING SAME, AND STORAGE MEDIUM

(71) Applicant: CANON KABUSHIKI KAISHA, Tokyo (JP)

(72) Inventor: Satoshi Kimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/690,352

(22) Filed: Aug. 30, 2017

(65) Prior Publication Data
US 2018/0063416 A1 Mar. 1, 2018

(30) Foreign Application Priority Data

Sep. 1, 2016 (JP) .................................. 2016-171298

(51) Int. Cl.
*H04N 5/232* (2006.01)
*H04N 1/21* (2006.01)

(52) U.S. Cl.
CPC ......... *H04N 5/23212* (2013.01); *H04N 1/215* (2013.01); *H04N 1/2145* (2013.01); *H04N 5/23222* (2013.01); *H04N 5/23293* (2013.01); *H04N 2201/0084* (2013.01)

(58) Field of Classification Search
CPC ........... H04N 5/23212; H04N 5/23222; H04N 2201/0084; H04N 5/23293; H04N 1/2145; H04N 1/215
See application file for complete search history.

(56) References Cited

U.S. PATENT DOCUMENTS

| | | | | |
|---|---|---|---|---|
| 2010/0073549 | A1* | 3/2010 | Sekine | G03B 13/32 348/345 |
| 2012/0044399 | A1* | 2/2012 | Hirai | H04N 5/23245 348/333.01 |
| 2012/0057048 | A1* | 3/2012 | Kindaichi | H04N 5/23212 348/231.99 |
| 2013/0258171 | A1* | 10/2013 | Kikuchi | H04N 5/23212 348/353 |
| 2017/0214844 | A1* | 7/2017 | Kikuchi | G03B 13/36 |
| 2018/0063413 | A1* | 3/2018 | Yoshino | G03B 7/006 |

FOREIGN PATENT DOCUMENTS

JP 2016-018034 A 2/2016

* cited by examiner

*Primary Examiner* — Nhan T Tran
(74) *Attorney, Agent, or Firm* — Cowan, Liebowitz & Latman, P.C.

(57) ABSTRACT

An image capturing apparatus, comprises an image sensor; a focus detection unit; a continuous shooting unit; an estimation unit that estimates an in-focus position of an object based on a result of the focus detection and information relating to an accumulation timing; and a focus adjustment unit that performs focus adjustment, wherein, the image sensor performs accumulation of the focus detection signal in a time period in which a storage unit cannot store the image signal for recording, the focus detection unit performs the focus detection, and the estimation unit estimates the in-focus position at the time of acquiring the image signal that is acquired after the end of the time period, based on the focus detection result and the information relating to the accumulation timing of the focus detection signal.

19 Claims, 11 Drawing Sheets

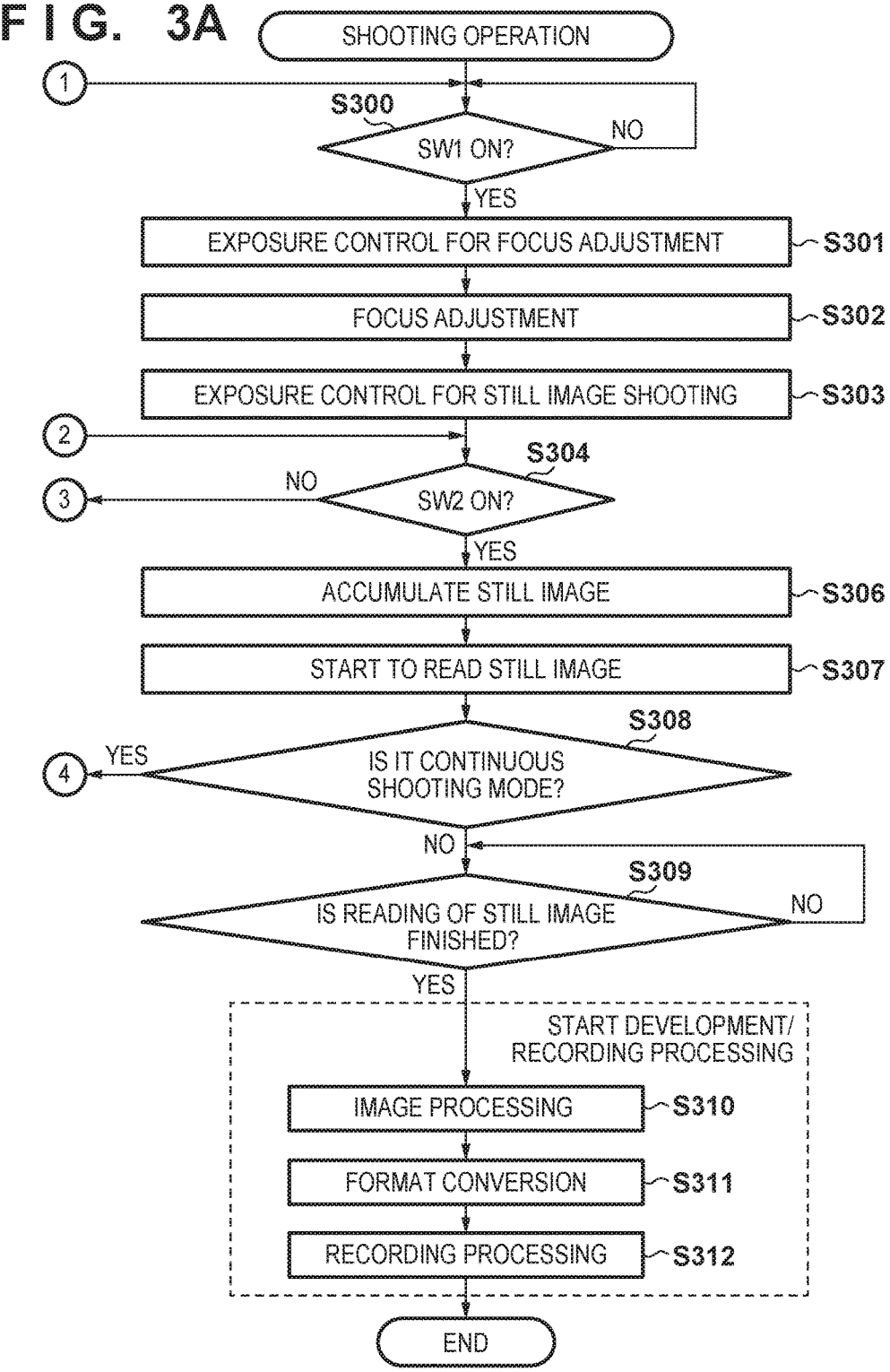

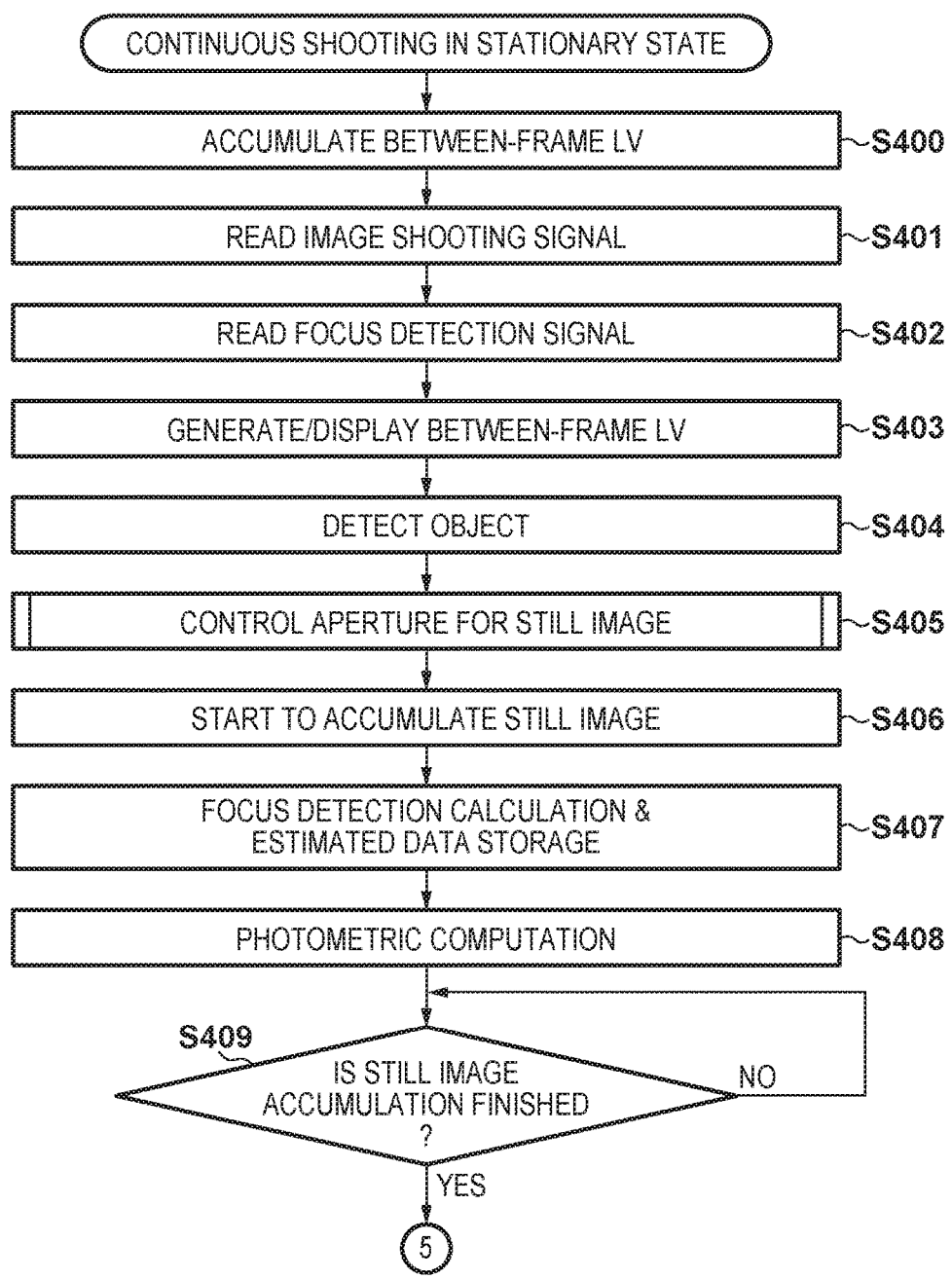

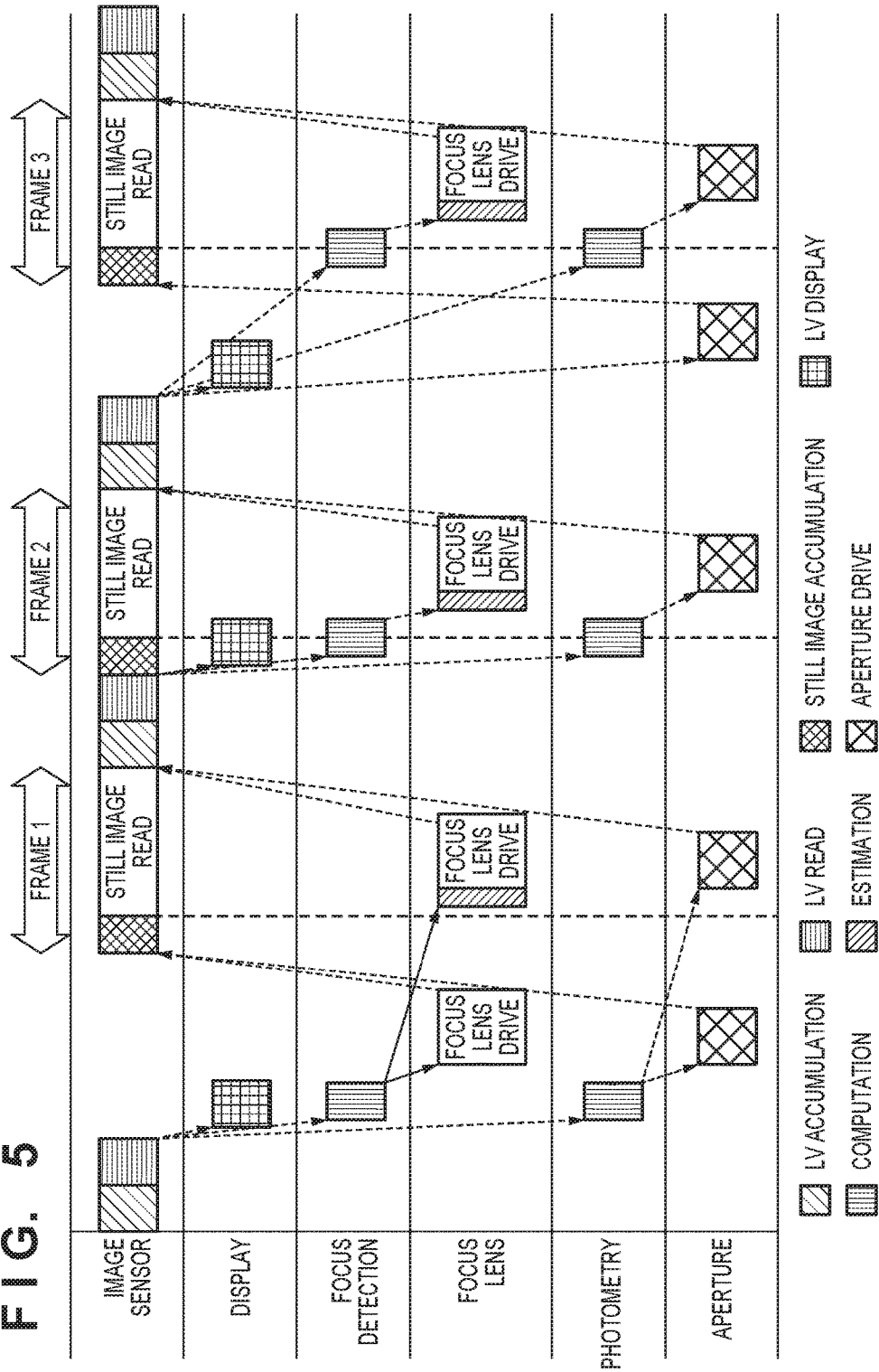

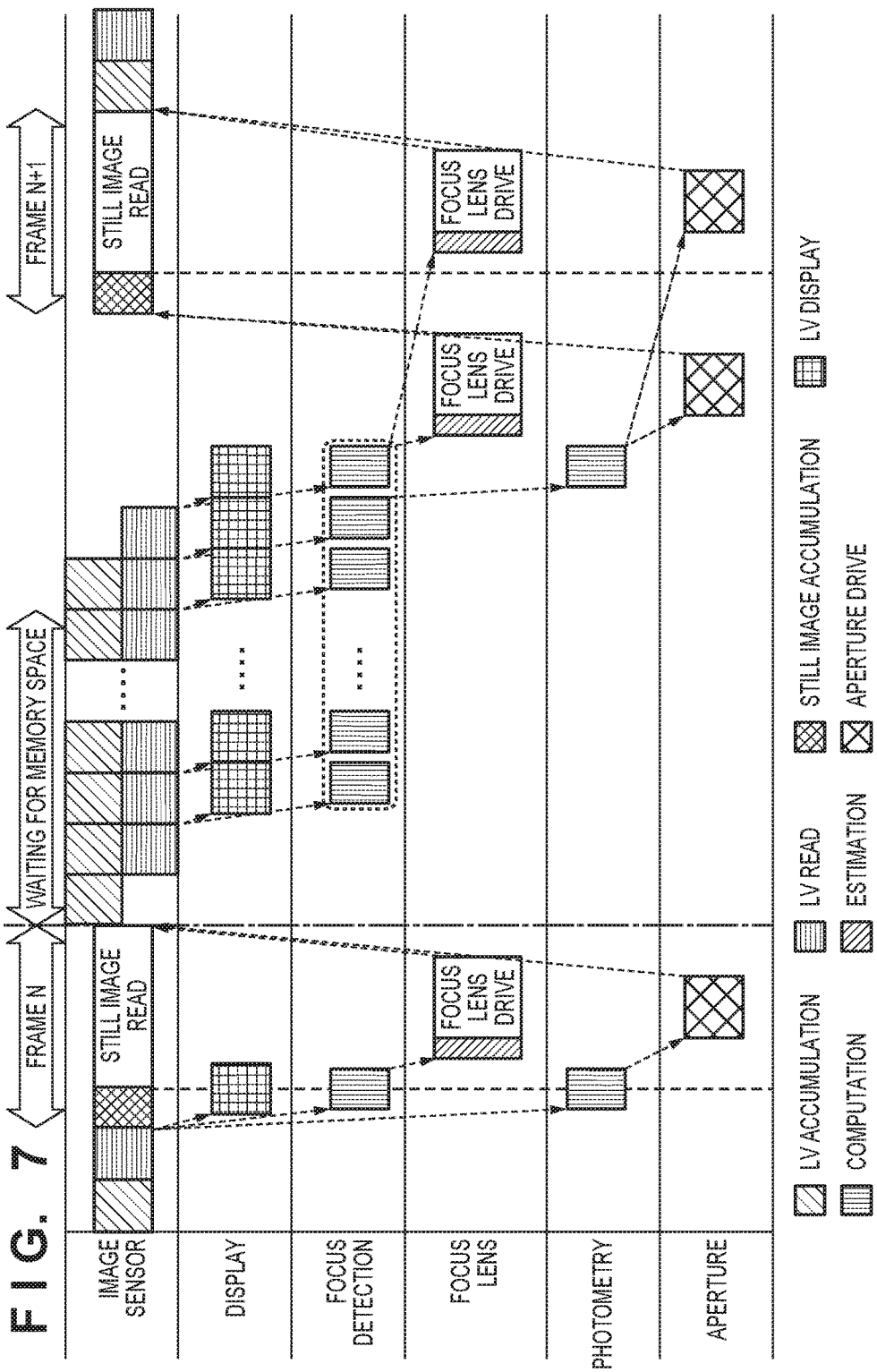

IMAGE CAPTURING APPARATUS, METHOD OF CONTROLLING SAME, AND STORAGE MEDIUM

BACKGROUND OF THE INVENTION

Field of the Invention

The present invention relates to an image capturing apparatus that can perform continuous shooting while performing focus detection using an output signal from an image sensor.

Description of the Related Art

Conventionally, image capturing apparatuses that can perform continuous shooting while focusing in accordance with change or movement of an object have been commercialized. Among such image capturing apparatuses, there are those that give consideration to a time lag between actual image capturing and focus detection for adjustment of a focal position, and perform a focus adjustment by estimating an in-focus position in an instant when actual image capturing is performed. Such an image capturing apparatus normally uses, as a method for focus detection, focus detection of a phase difference detection method that uses a dedicated sensor or focus detection of a contrast detection method that identifies a focus lens position for which contrast is a maximum.

Meanwhile, in recent years, image capturing apparatuses that perform imaging plane phase difference AF by using an image sensor that has pixels for focus detection, and perform focus adjustment during continuous shooting based on a result thereof have been proposed (Japanese Patent Laid-Open No. 2016-18034). The image capturing apparatus recited in Japanese Patent Laid-Open No. 2016-18034, in accordance with output of focus detection pixels included in image data at a time of main exposure, switches processing details of a subsequent focus adjustment operation. The image capturing apparatus recited in Japanese Patent Laid-Open No. 2016-18034 also has a mechanism for adjusting a shooting interval so that intervals for continuous shooting become fixed regardless of what focus adjustment processing details are applied. By this, it is possible to provide an image capturing apparatus that is easy to use for a photographer, in which the shooting interval is fixed at a time of continuous shooting.

Typically, it is desirable to be able to perform continuous shooting in fixed intervals that are as short as possible. In such a case, typically, a speed of writing to a recording medium used in an image capturing apparatus is not fast enough to enable image data obtained by continuous shooting to be written in real time. Therefore, the image data is temporarily stored in a buffer memory before being written to the recording medium. By using this method, it is possible to perform continuous shooting in a short, fixed time interval until the buffer memory becomes full.

However, continuous shooting cannot be performed endlessly even if a buffer memory is used, and once the buffer memory becomes full, it is necessary to move the image data from the buffer memory to the recording medium. A state is thus entered in which subsequent shooting cannot be performed until the image data is moved to the recording medium to make space in the buffer memory, and continuous shooting is temporarily stopped.

When such a situation occurs, in addition to the interval for continuous shooting ceasing to be fixed and convenience for the photographer being impaired, if imaging plane phase difference detection method AF as in Japanese Patent Laid-Open No. 2016-18034 is being performed, there is the possibility that focus accuracy of a shot image will decrease. In Japanese Patent Laid-Open No. 2016-18034, no mention is given regarding a decrease in AF accuracy in a case where the interval of continuous shooting ceases to be fixed in this way.

SUMMARY OF THE INVENTION

The present invention was conceived in view of the aforementioned problem, and provides an image capturing apparatus that can suppress a decrease in focus detection accuracy when performing focus detection of an imaging plane phase difference detection method during continuous shooting, even if maintaining a fixed continuous shooting interval ceases to be possible.

According to a first aspect of the present invention, there is provided an image capturing apparatus, comprising: an image sensor having a plurality of pixels; a focus detection unit configured to perform focus detection of an imaging optical system based on a focus detection signal obtained by the pixels; a continuous shooting unit configured to perform control to cause the image sensor to, a plurality of times, execute accumulation of an image signal for recording; a storage unit configured to store the image signal for recording; an estimation unit configured to estimate an in-focus position of an object at a time of acquiring the image signal for recording based on a result of the focus detection by the focus detection unit and information relating to an accumulation timing of the focus detection signal that is used in the focus detection; and a focus adjustment unit configured to control focus adjustment of the imaging optical system based on an estimation result by the estimation unit, wherein the image sensor performs accumulation of the focus detection signal in a time period in which the storage unit cannot store the image signal for recording, the focus detection unit performs the focus detection that uses the focus detection signal acquired in the time period, and the estimation unit estimates the in-focus position at the time of acquiring the image signal for recording that is acquired after the end of the time period based on the focus detection result that uses the focus detection signal acquired in the time period and the information relating to the accumulation timing of the focus detection signal used in the focus detection.

According to a second aspect of the present invention, there is provided a method of control an image capturing apparatus provided with an image sensor having a plurality of pixels and a focus detection unit that performs focus detection of an imaging optical system based on a focus detection signal obtained in accordance with the pixels, the method comprising: performing control to cause the image sensor to, a plurality of times, execute accumulation of an image signal for recording; performing, during a time period in which saving of the image signal for recording cannot be performed, accumulation of the focus detection signal and the focus detection based on the focus detection signal; estimating an in-focus position of an object at a time of acquiring the image signal for recording, based on a result of the focus detection and information relating to an accumulation timing of the focus detection signal that is used in the focus detection, wherein the in-focus position at the time of acquiring the image signal for recording that is acquired after the end of the time period is estimated based on the focus detection result that uses the focus detection signal acquired in the time period and the information relating to the accumulation timing of the focus detection signal used in the focus detection.

Further features of the present invention will become apparent from the following description of exemplary embodiments with reference to the attached drawings.

BRIEF DESCRIPTION OF THE DRAWINGS

FIGS. 3A and 3B are flowcharts that illustrate a flow of a series of shooting operations.

FIGS. 4A and 4B are flowcharts that illustrate a flow of continuous shooting in a stationary state.

FIG. 5 is a timing chart that illustrates a continuous shooting operation in a stationary state.

FIG. 7 is a timing chart that illustrates a continuous shooting operation in a buffer full state.

DESCRIPTION OF THE EMBODIMENTS

Explanation is detail is given of embodiments of the present invention below with reference to the drawings, but the present invention is not limited to the following embodiments. In addition, the embodiments of this invention indicate a preferred form of the invention, and do not limit the scope of the invention.

<Overall Configuration>

Figure 1:
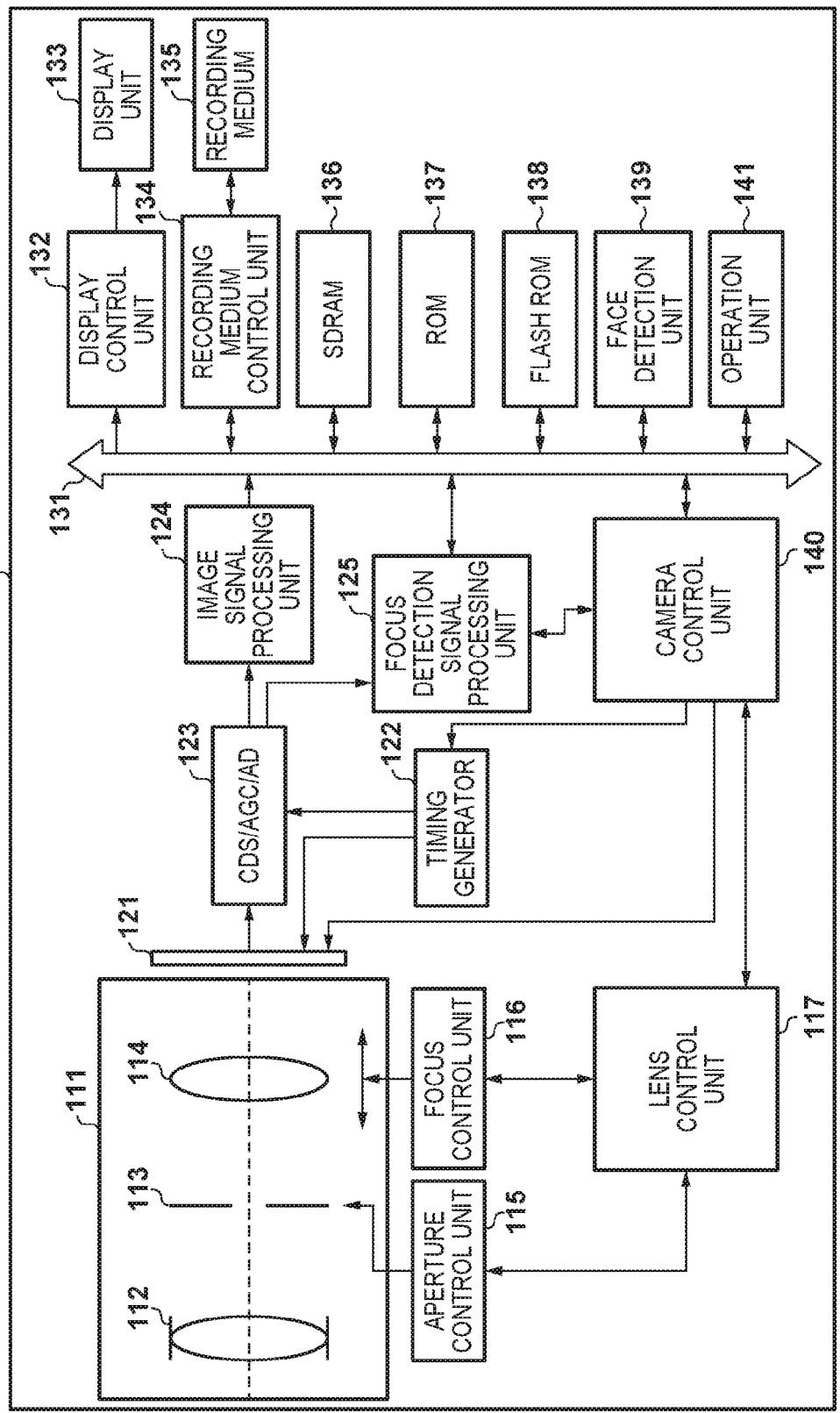
FIG. 1 is a block diagram that illustrates an overall configuration of an image capturing apparatus according to an embodiment of the present invention.

FIG. 1 is a block diagram that illustrates an overall configuration of an image capturing apparatus 101 according to an embodiment of the present invention. In FIG. 1, the image capturing apparatus 101 is for example a video camera or a digital still camera that can shoot an object and record data for a moving image or a still image to various media such as a tape, solid state memory, an optical disc, or a magnetic disk, but there is no limitation to this.

A shooting lens 111 (a lens unit) is configured by comprising a fixed lens 112, an aperture 113, and a focus lens 114. An aperture control unit 115 drives the aperture 113 to thereby adjust the amount of light at a time of shooting by adjusting an aperture diameter of the aperture 113. A focus control unit 116 decides a driving amount for driving the focus lens 114 based on a focus deviation amount of the shooting lens 111. An in-focus state is thus controlled by driving the focus lens 114. Automatic focus adjustment control is realized by control of movement of the focus lens 114 by the focus control unit 116. The focus lens 114 is a lens for focus adjustment, and although a single lens is simply illustrated in FIG. 1, it is normally configured by a plurality of lenses. The aperture control unit 115 and the focus control unit 116 are controlled by a lens control unit 117.

In the case of a lens-interchangeable type digital still camera or video camera, a camera control unit 140 transmits information necessary for focus adjustment, such as a lens driving amount, a defocus amount, or an image deviation amount to the lens control unit 117 of the attached lens. In this way, an image capturing apparatus (a digital still camera or video camera) can control focus adjustment by controlling an attached lens.

A light beam that is incident via such optical members (the shooting lens 111), forms an image on a light receiving plane of an image sensor 121, and is converted to an electrical signal by the image sensor 121. The image sensor 121 is configured by a CCD or CMOS sensor that has a large number of photoelectric conversion elements that convert an object image (an optical image) into signal charges. The signal charges that accumulate at the photoelectric conversion elements are sequentially read from the image sensor 121 as a voltage signal in accordance with the signal charge, in accordance with a driving pulse outputted by a timing generator 122.

A CDS/AGC/AD converter 123 performs correlated double sampling processing to remove reset noise, gain adjustment processing, and signal digitization with respect to a focus detection signal and an image signal read from the image sensor 121. The CDS/AGC/AD converter 123 respectively outputs the image signal to an image signal processing unit 124, and a signal for on-imaging plane phase difference focus detection to a focus detection signal processing unit 125.

The focus detection signal processing unit 125 performs a correlation computation with respect to the two image signals for focus detection outputted from the CDS/AGC/AD converter 123, and calculates an image deviation amount and reliability information (a degree of coincidence of the two images and sharpness of the two images). A defocus amount and a defocus direction for the imaging optical system are also calculated from the obtained image deviation amount. In addition, the focus detection signal processing unit 125 performs arrangement or setting of a focus detection region in which to perform focus detection in an imaging screen.

Figure 2:
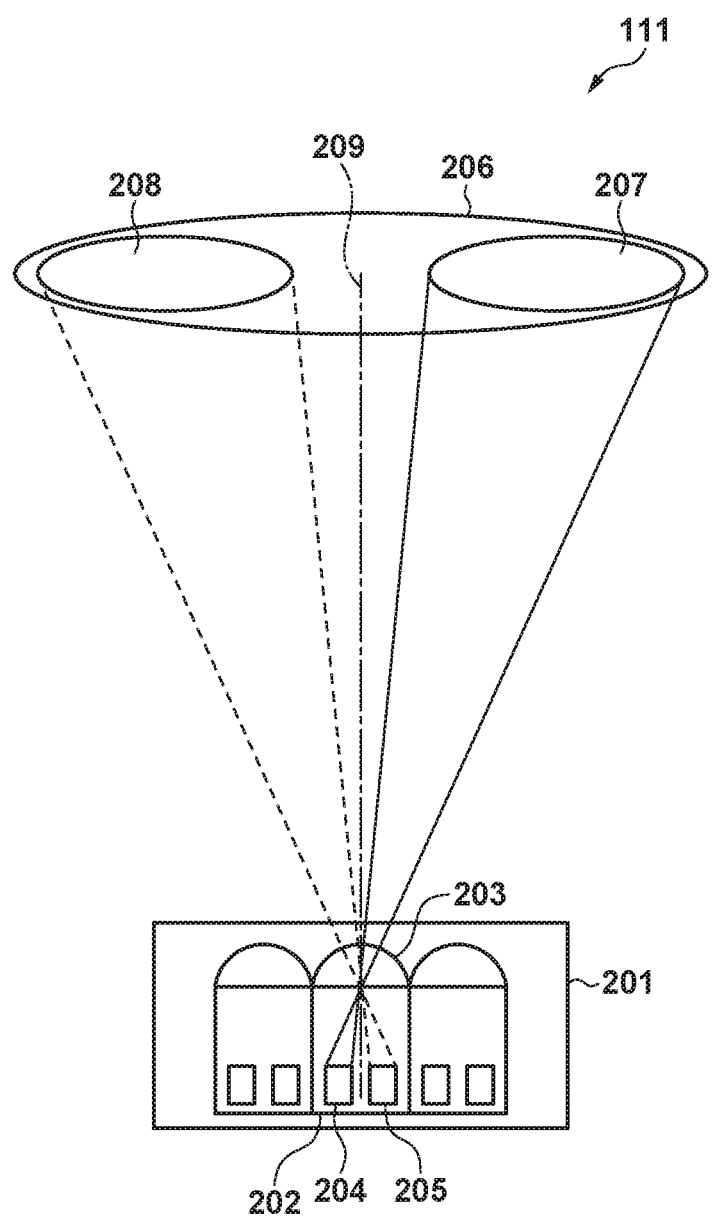
FIG. 2 is a schematic diagram that illustrates a relationship between light received by an image sensor, and a pupil of an imaging optical system.

FIG. 2 is a view that illustrates a relation between the image sensor 121 and the shooting lens ill. The image sensor 121 is configured by a two-dimensional arrangement of m×n (a plurality of) pixels, and reference numeral 201 of FIG. 2 illustrates a cross section of the image sensor 121. Arranged in each pixel (unit pixel) 202 is one microlens 203 and two photoelectric conversion elements 204 and 205, and the pixel can generate an image signal to be used in automatic focus adjustment in accordance with an imaging plane phase difference detection method. A light beam that passes through different pupil regions 207 and 208 of a pupil 206 of the shooting lens 111 is incident on the two photoelectric conversion elements 204 and 205 provided in the pixel, via the microlens 203 that is arranged for each pixel 202 centered on an optical axis 209. Accordingly, with one pixel it is possible to acquire two signals: one for image capturing and one for focus detection. By adding the output of the two photoelectric conversion elements 204 and 205, it is possible to acquire a capture image, and an image signal (image data) is generated by the image signal processing unit 124. It is also possible to acquire two images having different parallax (parallax images) from the output of the two photoelectric conversion elements, and the focus detection signal processing unit 125 performs a focus detection computation based on these images. In the present embodiment, a result of adding the outputs of the two photoelectric conversion elements is referred to as an A+B image, and the outputs of the two photoelectric conversion elements are respectively referred to as an A image and a B image. For a method of generating a phase difference signal, there is no limitation to the method of the present embodiment, and another method may be used. Details of a focus detection method are described later. In addition, in the present invention and the present specification, it is assumed that a focus detection pixel is not just a pixel dedicated to focus detection, but includes a pixel that is used both for acquiring a signal for image capturing and acquiring a focus detection signal, as described above.

The image signal processing unit 124 has a circuit block for performing image processing such as white balance or gamma correction, and a circuit block for calculating a photometric value in accordance with a brightness of an object, based on an image signal outputted from the CDS/AGC/AD converter 123. An image signal that has been processed by the image signal processing unit 124 is stored in an SDRAM 136 via a bus 131.

The image signal stored in the SDRAM 136 is read by a display control unit 132 via the bus 131, and displayed on a display unit 133. In addition, because it functions as a buffer memory at a time of writing to a recording medium 135, the SDRAM 136 is also used to temporarily store an encoded compressed image signal for recording and when writing to the recording medium 135 via a recording medium control unit 134. At that time, the written image signal is deleted from the SDRAM 136 so that a subsequent image signal can be stored. Normally, because the SDRAM 136 can temporarily store a lot of images for recording if its capacity is large enough, it is possible to continue high-speed continuous shooting even if a long write time to the recording medium 135 is incurred.

A ROM 137 stores for example a control program that the camera control unit 140 executes and various data required for control, and a flash ROM 138 stores for example various setting information relating to operation of the camera main body 101, such as user setting information.

The camera control unit 140 performs automatic exposure adjustment and automatic focus adjustment, based on the control program and the various data necessary for control stored in the ROM 137. Specifically, automatic focus adjustment is realized by converting a defocus amount outputted from the focus detection signal processing unit 125 to a lens driving amount, and subsequently conveying this to the lens control unit 117 and the focus control unit 116. Furthermore, the camera control unit 140 controls the aperture 113, the CDS/AGC/AD converter 123, mechanical shutter (omitted in the drawing), and the image sensor 121, based on a photometric value outputted from the image signal processing unit 124. Automatic exposure adjustment that automatically adjusts the exposure amount at a time of still image shooting and an exposure amount for a live-view display is thus realized.

A face detection unit 139 performs face detection using a publicly known method, from image data accumulated in the SDRAM 136. For a known technique for face detection, there is a method that uses knowledge regarding a face (skin color information and parts such as eyes, nose, and mouth), a method that configures a classifier for face detection in accordance with a learning algorithm typified by a neural net, or the like.

An operation unit 141 comprises switches for inputting various operations related to shooting, such as a power button or a shutter button, for example. It also comprises a menu display button, a decide button, in addition to a cursor keypad, a pointing device, a touch panel, or the like, and transmits an operation signal to the camera control unit 140 when these keys or buttons are operated by a user. The foregoing is an overall configuration of the image capturing apparatus 101 in the present embodiment.

Next, explanation is given using FIG. 3A through FIG. 7 regarding characteristic operation of the image capturing apparatus 101 of the present embodiment. Note that processing of the flowcharts of FIGS. 3A, 3B, FIGS. 4A, 4B, and FIGS. 6A-6C which illustrate operations of the present embodiment, are executed in the camera control unit 140 based on the control program and various data necessary for control that are stored in the ROM 137.

<Shooting Operation>

Figure 3B:
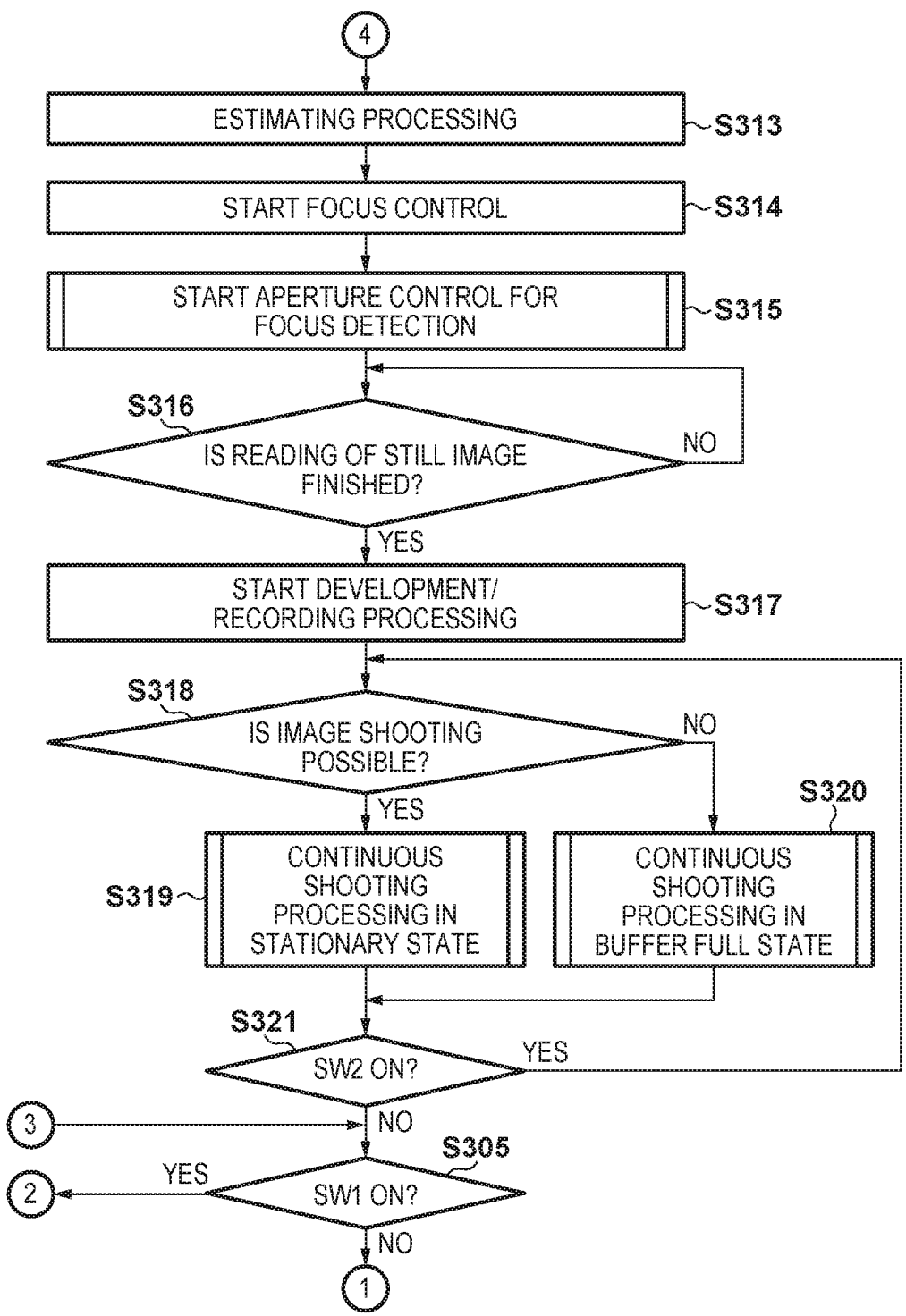

Explanation is given below using the flowcharts of FIGS. 3A and 3B of a flow of a series of shooting operations in the present embodiment. Firstly, in step S300, it is determined whether a release switch SW1 included in the operation unit 141 has been pressed. In step S300, if the release switch SW1 has not been pressed, waiting is performed until the release switch SW1 is pressed. Meanwhile, if the release switch SW1 has been pressed the processing proceeds to step S301 and a series of shooting preparation operations is started.

In step S301, exposure control processing for focus adjustment is performed. Specifically, so that exposure conditions suitable for focus adjustment processing in the following step S302 are achieved, the camera control unit 140 controls an accumulation time period of the image sensor 121 and operation of the CDS/AGC/AD converter 123 and the aperture 113 based on the photometric value outputted from the image signal processing unit 124.

Next, in step S302, the camera control unit 140 converts the defocus amount outputted from the focus detection signal processing unit 125 into a lens driving amount. By conveying this lens driving amount to the lens control unit 117 and controlling the focus control unit 116, a focus adjustment for a most recent still image shooting is performed. An in-focus position (=a focus detection result) identified based on the defocus amount obtained from the focus detection signal processing unit 125 at this point is stored in the SDRAM 136 in association with an accumulation time that is a basis of a defocus amount calculation and is used in estimation processing that is explained later.

Next, in step S303, exposure control for still image shooting is performed. The camera control unit 140 controls operation of the aperture 113 and the CDS/AGC/AD converter 123, and an accumulation time period for the mechanical shutter and the image sensor 121, based on the photometric value outputted from the image signal processing unit 124, and makes adjustments so that an appropriate exposure amount is attained for a still image shooting image to be recorded. By step S301 and step S303, accumulation of signals for focus detection and accumulation of image signals for recording are alternately executed. Note that accumulation of signals for focus detection indicates accumulation of charges for acquiring a signal for focus detection. Similarly, accumulation of an image signal for recording indicates accumulation of charges for acquiring an image signal for recording.

Next, in step S304, it is determined whether a release switch SW2 included in the operation unit 141 has been pressed. If the release switch SW2 has not been pressed the processing proceeds to step S305, and if pressed the processing proceeds to step S306.

In step S305, it is determined whether the release switch SW1 has been pressed. If the release switch SW1 has not been pressed in step S305, the processing returns step S304, and it is determined whether the release switch SW2 has been pressed. In other words, waiting to start still image shooting is performed until the release switch SW2 is pressed. Meanwhile, if the release switch SW1 has not been pressed in step S305, the processing returns to step S300. In other words, it is assumed that the shooting preparation state has been cancelled by the photographer, and monitoring for the release switch SW1 to be pressed for subsequent shooting preparation is performed. In step S306, accumulation by the image sensor 121 is performed in order to generate an image signal for still image shooting.

Next, in step S307, reading of the charges accumulated in the image sensor 121 in step S306 is started. As explained earlier, each of the pixels that configure the image sensor 121 in the present embodiment is provided with two photoelectric conversion elements, and a signal resulting from adding outputs of these two photoelectric conversion elements is read and used to generate an image signal for still image shooting.

Next, in step S308, it is determined whether a setting of the image capturing apparatus 101 is a continuous shooting mode. If the continuous shooting mode has not been entered in step S308, the processing proceeds to step S309 next, and in the case of the continuous shooting mode the processing proceeds to step S313.

In step S309, it is determined whether the reading of an image signal for a still image for recording that was started in step S307 has completed. If it has not completed, completion of the reading of the image signal is awaited, and when completed the processing proceeds to step S310.

In step S310, with the image signal read in the processes of step S307 through step S309 as an input, the image signal processing unit 124 performs image processing such as a white balance or gamma correction.

In step S311, encoding processing for recording is performed prior to writing still image data to the recording medium 135 via the recording medium control unit 134. In the present embodiment, an image format conversion to a JPEG format or the like is performed, and then the still image data is temporarily stored in the SDRAM 136. In step S312, the still image data recorded in the SDRAM 136 is written to the recording medium 135 via the recording medium control unit 134. The foregoing processing described in step S310 through to step S312 is referred to as development/recording processing in the present embodiment.

If not in the continuous shooting mode in step S308, the processing proceeds to step S313. Step S313 is performed during reading of an image signal for a still image for recording. In step S313, an estimation is made for an object position (a focal position for focusing on the object) at the shooting timing of a second frame, based on focus detection results of a plurality of times acquired before continuous shooting is started, or a focus detection result obtained in the process of the focus adjustment of step S302. The estimation uses information of times at which the focus detection signal used in focus detection was acquired. For example, a focus detection result a1 acquired at time t1 that is before continuous shooting is started and a focus detection result a2 that is acquired at a subsequent time t2 are used to calculate the movement speed of the object from the change of the distance of the object (a2−a1) and the movement time period (t2−t1). Based on the obtained movement speed and the time period until the shooting timing for the second frame, an estimation is made for what extent the movement distance of the object will be, and focus control to the position of the movement destination is performed. When continuous shooting is stopped until space can be made in the buffer memory and the interval for continuous shooting ceases to be fixed, there is a possibility that the shooting timing of the next frame that is estimated in this step and the timing at which the next frame is actually shot will deviate. When deviation occurs, this leads to a decrease of AF accuracy. In addition, in a case of using three or more focus detection results to estimate the object position at the shooting timing of the next frame, when performing estimation in which the shooting interval is considered to be fixed, there is also a possibility that a decrease of AF accuracy will occur in accordance with deviation in the shooting interval due to continuous shooting temporarily stopping. In the present embodiment, it is possible to reduce such a decrease of AF accuracy by performing focus detection even while there is no space in the buffer memory (a full state) and the shooting has been temporarily stopped. Detailed explanation will be given later.

Next, in step S314, position control of the focus lens 114 to the focus position estimated in step S313 is actually started. Next, in step S315, aperture control for focus detection is started. Aperture control for focus detection in the present embodiment is performed during reading of an image signal for a still image for recording, and controls exposure conditions based on a photometry result acquired immediately prior to achieve an aperture value suitable for focus detection in accordance with imaging plane phase difference AF that is performed between continuous shooting. Here, an aperture value suitable to focus detection in accordance with imaging plane phase difference AF is an aperture value that, using imaging plane phase difference AF in the image sensor 121, satisfies conditions that are necessary for image capturing an object and is the same value as much as possible at the time of still image shooting for the next frame. For example, when image capturing an object by using imaging plane phase difference AF in the image sensor 121, to maintain a predetermined focus detection accuracy, assume that it is necessary to set the aperture value of the aperture 113 to a state in which it is opened at F8 or more (including F8). In such a case, if hypothetically the aperture value for performing alignment to an appropriate exposure for still image shooting of the next frame is F4, because it is more open than F8, it is sufficient to set to the same F4 as at the time of still image shooting (this aperture value is referred to as an "aperture value suitable for still image acquiring"). If the aperture value for performing alignment to an appropriate exposure for still image shooting of the next frame is F11, because it is a smaller aperture than F8, a setting is made here to F8 which is the aperture value of the limit at which accuracy for imaging plane phase difference AF can be maintained (this aperture value is referred to as an "aperture value suitable for focus detection in accordance with imaging plane phase difference AF").

Next, in step S316, it is determined whether the reading of an image signal for a still image for recording that was started in step S307 has completed. If it has not completed, completion of the reading of the image signal is waited for, and when completed the processing proceeds to step S317.

Next, in step S317, the development/recording processing described earlier in step S310 to step S312 is started. As previously indicated in the development/recording processing, the still image data after a format conversion is temporarily stored in the SDRAM 136 before being written to the recording medium 135. By this configuration, if the speed of writing to the recording medium 135 is slower than the generation of still image data after the format conversion, the still image data will be accumulated in the SDRAM 136. In the present embodiment, although shooting of a subsequent image is possible if there is space for saving still image data in the SDRAM 136, control is performed so as to prohibit subsequent shooting if there is no space. Therefore, in step S318, if subsequent shooting is possible the processing proceeds to step S319, and if the shooting is not possible the processing proceeds to step S320.

Step S319 is continuous shooting processing in the stationary state in the case where it is possible to maintain a fixed shooting interval. Details of this processing are described later. Meanwhile, step S320 is continuous shooting processing in the case where written still image data has reached a number of shots that the SDRAM 136 can store and the fixed shooting interval can no longer be maintained (referred to as a buffer full state in the present embodiment). Details of this processing are described later.

When the processing of step S319 or step S320 has completed, the processing proceeds to step S321 and it is determined whether the release switch SW2 is pressed. If the release switch SW2 is pressed in step S321, the processing returns to step S318, and the series of continuous shooting processing from step S318 to step S321 is continued. Meanwhile, if the release switch SW2 is not pressed in step S321, the processing returns to step S305, and a transition is made to single shooting processing from continuous shooting processing. The foregoing is the overall flow of the series of shooting operations in the present embodiment.

<Stationary State Continuous Shooting Processing>

Explanation is given below using the flowcharts of FIGS. 4A and 4B of a flow of continuous shooting processing in a case where it is not possible to maintain a fixed shooting interval in the present embodiment.

Firstly, in step S400, accumulation is performed for a live image for display that is displayed between continuous shooting (referred to as between-frame LV in the present embodiment). Next, in step S401, the charges accumulated in the image sensor 121 in step S400 are read. As explained earlier, each of the pixels that configure the image sensor 121 in the present embodiment is provided with two photoelectric conversion elements, and a signal resulting from adding outputs of these two photoelectric conversion elements (the A+B image) is read and used to generate an image signal for a between-frame LV.

Next, in step S402, the charges accumulated in the image sensor 121 in step S400 are read. Here, unlike the previous step S401, to perform focus detection in accordance with imaging plane phase difference AF, the outputs of the two photoelectric conversion elements are each read separately, and two images (the A image and the B image) having different parallax are acquired as focus detection signals. Configuration may be taken to, instead of individually reading each output of the two photoelectric conversion elements separately, read only the output of one of the two photoelectric conversion elements and acquire the output signal of the other photoelectric conversion element from the difference with the signal resulting from adding the outputs of the two photoelectric conversion elements (the A+B image) that is acquired in step S401. Accordingly, in the process of step S400 through step S402, it is possible to acquire an image signal for between-frame LV (the A+B image) and two parallax images (the A image and the B image) for focus detection in accordance with imaging plane phase difference AF. It is assumed that the image signal for between-frame LV is also used for face detection processing by the face detection unit 139 (object detection processing), and calculation of a photometric value in accordance with a photometric computation which is described later.

Next, in step S403, a live image for between frames that is displayed between continuous shooting is generated and displayed. Taking the image signal for between-frame LV that is read by the image sensor 121 in step S401 earlier as an input, processing is performed by the image signal processing unit 124 to implement image processing such as white balance or gamma correction. Subsequently, the image signal is stored in the SDRAM 136 via the bus 131, read by the display control unit 132, and displayed on the display unit 133.

Next, in step S404, face detection processing by the face detection unit 139 is performed based on the image signal for between-frame LV that is obtained in step S401. If there is a face that can be detected in the image signal, the position and size of the face are calculated. Position and size information of the face obtained here is used when deciding a focus detection region in the focus detection signal processing unit 125, in a focus detection computation that is described later.

Next, in step S405, aperture control for a still image is started. Envisioning that the accumulation by the image sensor 121 in step S400 is used in focus detection by imaging plane phase difference AF, control is performed such that an aperture value suitable therefor is achieved in step S315 of FIG. 3B which is described earlier. In contrast to this, in step S403, exposure conditions are controlled based on a photometry result acquired immediately prior to achieve an aperture value suitable for subsequent still image shooting. Note that, in step S405, the aperture 113 is not necessarily driven, and the aperture 113 is not driven if the aperture value set immediately prior is the same as an aperture value to be set for a time of still image shooting. In addition, it is assumed that, if the aperture 113 is driven in step S405, the processing does not proceed to the subsequent step S406 until the driving completes.

In step S406, an accumulation process by the image sensor 121 is performed in order to generate an image signal for still image shooting. The processing details are similar to step S306 which is described earlier, but in step S406 the processing proceeds to the subsequent step S407 without waiting for the completion of the accumulation process.

In step S407, a correlation computation is performed in the focus detection signal processing unit 125, based on the two parallax images (the A image and the B image) for focus detection in accordance with imaging plane phase difference AF that are read in step S402 earlier. The image deviation amount and the reliability information (degree of coincidence of the two images and sharpness of the two images) are then calculated. A defocus amount and a defocus direction for the imaging optical system are also calculated from the obtained the image deviation amount. In addition, the in-focus position (=a focus detection result) identified based on the calculated defocus amount is stored in the SDRAM 136 in association with an accumulation time that it is based on, and is used in estimation processing. Note that a plurality of focus detection results and accumulation times are stored in the SDRAM 136, and in estimation processing, a focus position at a target timing of still image shooting is identified based on history information of past focus detection results.

Next, in step S408, a photometric computation is performed. The image signal for between-frame LV acquired in step S401 earlier is processed by the image signal processing unit 124 to calculate a photometric value. In step S409, it is determined whether the accumulation process for still image shooting that started in step S406 has completed. When the accumulation process has not completed in step S409, waiting is performed until accumulation process completes. Meanwhile, when the accumulation process has completed, the processing proceeds to the subsequent step S410. Accordingly, the processing from step S407 to step S408 is executed in parallel with the accumulation process for still image shooting.

Next, in step S410, reading of the charges accumulated in the image sensor 121 is started. The processing details in step S410 are the same as those of step S307 which is described earlier. Next, in step S411, estimation processing is performed to prepare for still image shooting of the next frame. The processing details are the same as those of step S313 which is described earlier. Next, in step S412, movement of the focus lens 114 to the focus position that is estimated based on the result of the estimation processing of step S411 is started.

In step S413, aperture control for focus detection, similar to that in step S315, starts. Next, in step S414, it is determined whether the driving of the aperture 113 and the focus lens 114, for which control started in step S412 and in step S413, has completed. If driving of the aperture 113 and the focus lens 114 has completed in step S414, the processing proceeds to the subsequent step S415, and if it has not completed, waiting is performed until driving of the aperture 113 and the focus lens 114 completes.

Next, in step S415, it is determined whether the reading of an image signal for still image recording that started in step S410 has completed. If it has not completed, completion of the reading of the image signal is awaited, and when completed the processing proceeds to step S416. Accordingly, the processing from step S411 to step S414 is performed in parallel with reading of the image signal for still image recording. Next, in step S416, the development/recording processing described earlier in step S317 is started. The above is the flow of continuous shooting processing in the case where it is possible to maintain a fixed shooting interval, in the present embodiment.

<Operation Example of Stationary State Continuous Shooting Processing>

Figure 4B:
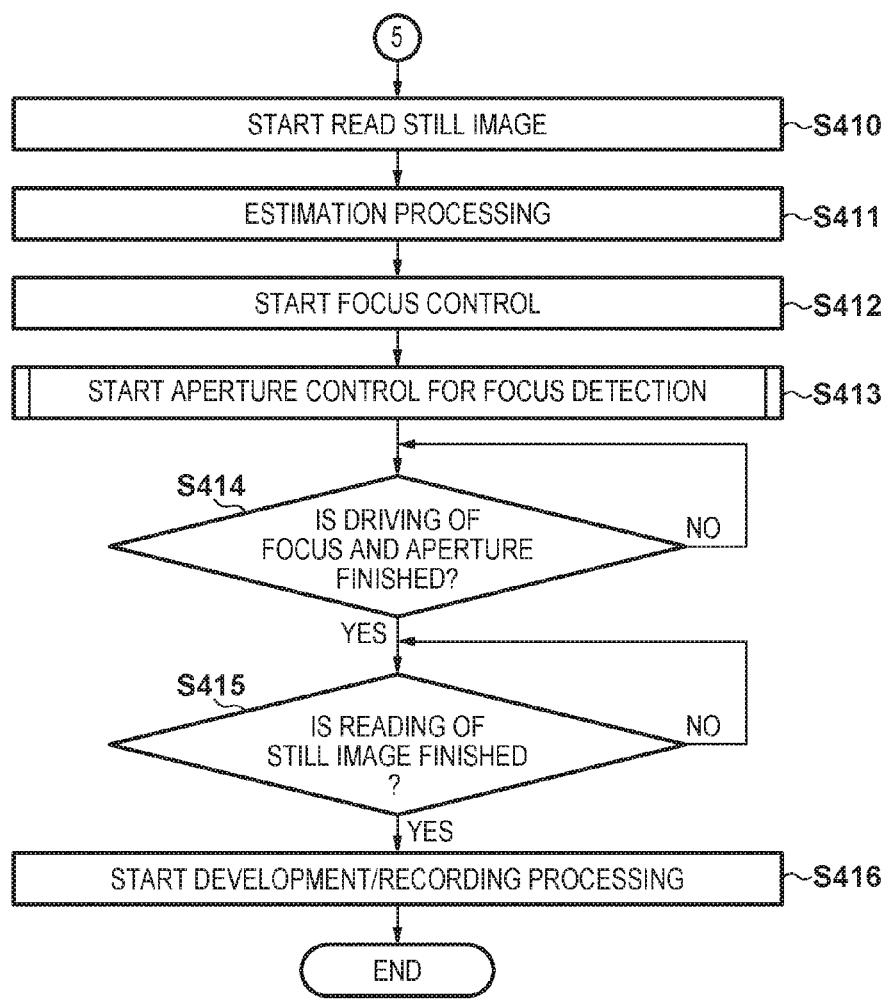

Next, FIG. 5 is used to give an explanation regarding a detailed operation example in a case where the flowcharts of FIGS. 4A and 4B are executed in the present embodiment.

It is assumed that, in the second frame of FIG. 5, the aperture value for still image shooting is more open than F8. In such a case, aperture control is performed to attain the aperture value for still image shooting of the second frame during the time period for reading the still image of the first frame. Accordingly, accumulation for a subsequent focus detection in accordance with imaging plane phase difference AF can be performed in a state where focus detection accuracy is maintained. In addition, in such a case high-speed continuous shooting becomes possible because image capturing a still image of the second frame can be started without controlling the aperture again after an accumulation for focus detection in accordance with imaging plane phase difference AF.

In addition, it is assumed that an aperture value for still image shooting in the third frame of FIG. 5 is a smaller aperture than F8 (the aperture value is larger than F8). In such a case, aperture control is performed during the time period for reading the still image of the second frame so that it is possible to maintain an aperture value of F8 or less which is an aperture value that enables focus detection accuracy in imaging plane phase difference AF to be maintained. Accordingly, accumulation for a subsequent focus detection in accordance with imaging plane phase difference AF can be performed in a state where focus detection accuracy is maintained. In such a case, the speed of continuous shooting decreases proportionally to controlling the aperture again to be the aperture value for the still image of the third frame after accumulation for focus detection in accordance with imaging plane phase difference AF. However, because focus detection in accordance with imaging plane phase difference AF under appropriate conditions is possible, continuous shooting without lowering the ability to track exposure or focus is possible. In addition, high-speed continuous shooting independent of a time period for controlling the aperture or the focus lens is possible because aperture control and focus lens control for the next frame is performed during the time period for reading out the still image of each frame.

<Continuous Shooting Processing in Buffer Full State>

Explanation is given below using the flowcharts of FIGS. 6A-6C of a flow of continuous shooting processing in a case where it is not possible to maintain a fixed shooting interval in the present embodiment.

Processing of step S500 to step S504 is the same as the processing of step S400 to step S404 of FIG. 4A, and so explanation thereof is omitted.

Next, in step S505, similarly to in step S407 of FIG. 4A, a focus detection computation and storage of estimated data is performed. Next, in step S506, similarly to step S318 of FIG. 3B, the space status of the SDRAM 136 is confirmed, and it is determined whether subsequent still image shooting is possible. If subsequent still image shooting is possible in step S506 the processing proceeds to step S507, and if still image shooting is not possible the processing returns to step S500. In other words, until a state where subsequent still image shooting is possible is achieved, (to the extent that the buffer full state continues) continuous shooting is temporarily stopped, and the series of processes from step S500 to step S505 (in the present embodiment, between-frame LV display and accumulation of focus detection data) is repeatedly performed. Accordingly, the between-frame LV is continuously displayed on the display unit 133 in this time period. Additionally, a focus detection result is periodically calculated based on the two parallax images (the A image and the B image) for focus detection in accordance with imaging plane phase difference AF that are obtained by accumulation of the between-frame LV in this period, and is sequentially stored in the SDRAM 136 together with an accumulation time that it is based on. In this way, by periodically calculating a focus detection result in the buffer-full time period, it is possible to reduce a decrease of AF accuracy because it is possible to use a focus detection result during the buffer-full time period in estimation processing (step S514) performed after the buffer full state is resolved. In addition, configuration may be taken to only perform acquisition of the focus detection signal during the buffer-full time period, but when configuration is taken to calculate the focus detection result during the buffer-full time period, it is possible to shorten the time period taken for estimation processing after the buffer full state is resolved by the time period taken for this calculation. Also, configuration may be taken to perform focus driving in the buffer-full time period based on a focus detection result acquired during the buffer-full time period, but it is possible that a timing for performing focus driving and a timing at which a full buffer is resolved will overlap. Accordingly, it is desirable to not perform focus driving during the buffer-full time period, or to restart continuous shooting in preference to focus driving once the full buffer is resolved.

Next, when shooting is possible in step S506 (when the buffer full state is cancelled), the processing proceeds to step S507. Step S507 through step S512 is the same as step S500 through step S505 which were described earlier, and processing is performed from the accumulation of the between-frame LV to a focus detection computation based on an output thereof and the storage of estimation data.

Next, in step S513, a photometric computation is performed. The processing details are the same as those of step S408 of FIG. 4A. Next, in step S514, estimation processing is performed. The estimation processing of step S514 uses history information of past focus detection results that are saved in the SDRAM 136 by the processing of step S500 to step S505 that is repeated in the case where the buffer full state continued. Based on this, an estimation is made for the focus position of the object at the timing of still image shooting immediately after the buffer full state is cancelled (a first instance after continuous shooting restarts).

In step S515, the focus lens 114 is driven, targeting the estimated focus position of the object at the still image shooting timing immediately after the buffer full state is cancelled that is obtained in step S514.

Next, in step S516, aperture control for a still image is started. The processing details are similar as those of step S405 of FIG. 4A, but here the completion of driving of the aperture 113 is not waited for, and control is performed such that driving of the focus lens 114 started in step S515 and driving of the aperture 113 are performed in parallel.

Next, in step S517, it is determined whether driving of the aperture 113 and the focus lens 114 has completed. If driving of the two has not completed in step S517, waiting is performed until the driving completes. Meanwhile, when driving of the focus lens 114 and the aperture 113 has completed, the processing proceeds to step S518.

In the processing of step S507 through step S517 explained here, unlike the stationary state continuous shooting processing flows of FIGS. 4A and 4B, control is performed so that a result of exposure adjustment and focus adjustment with respect to still image shooting immediately after the buffer full state is cancelled is reflected instead of exposure adjustment and focus adjustment prepared for still image shooting of one frame earlier.

In step S518, an accumulation process by the image sensor 121 is performed in order to generate an image signal for still image shooting. The processing details are the same as those of step S306 which is described earlier in FIG. 3A. Next, in step S519, reading of the charges accumulated in the image sensor 121 is started. The processing details in step S519 are the same as that of step S307 which is described earlier. Next, in step S520, estimation processing is performed. In the estimation processing of step S520, an estimation is made for the focus position of the object at the next timing of still image shooting, based on the history information of past focus detection results that are saved in the SDRAM 136.

In step S521, the focus lens 114 is driven, targeting the estimated focus position of the object at the next still image shooting timing that is obtained in step S520. In step S522, aperture control for focus detection, similar to that in step S315 of FIG. 3B, starts.

Next, in step S523, it is determined whether driving of the aperture 113 and the focus lens 114 has completed. If driving of the two has not completed in step S523, waiting is performed until the driving completes. Meanwhile, when driving of the focus lens 114 and the aperture 113 has completed, the processing proceeds to step S524.

In step S524, it is determined whether the reading of an image signal for a still image for recording that was started in step S519 has completed. If it has not completed, completion of the reading of the image signal is awaited, and when completed the processing proceeds to step S525. Accordingly, the processing from step S520 to step S523 is performed in parallel with reading of the image signal for a still image for recording. Next, in step S525, the development/recording processing described earlier in step S317 is started. The above is the flow of continuous shooting processing in the case where it is not possible to maintain a fixed shooting interval, in the present embodiment.

<Operation Example of Continuous Shooting Processing in Buffer Full State>

Figure 6A:
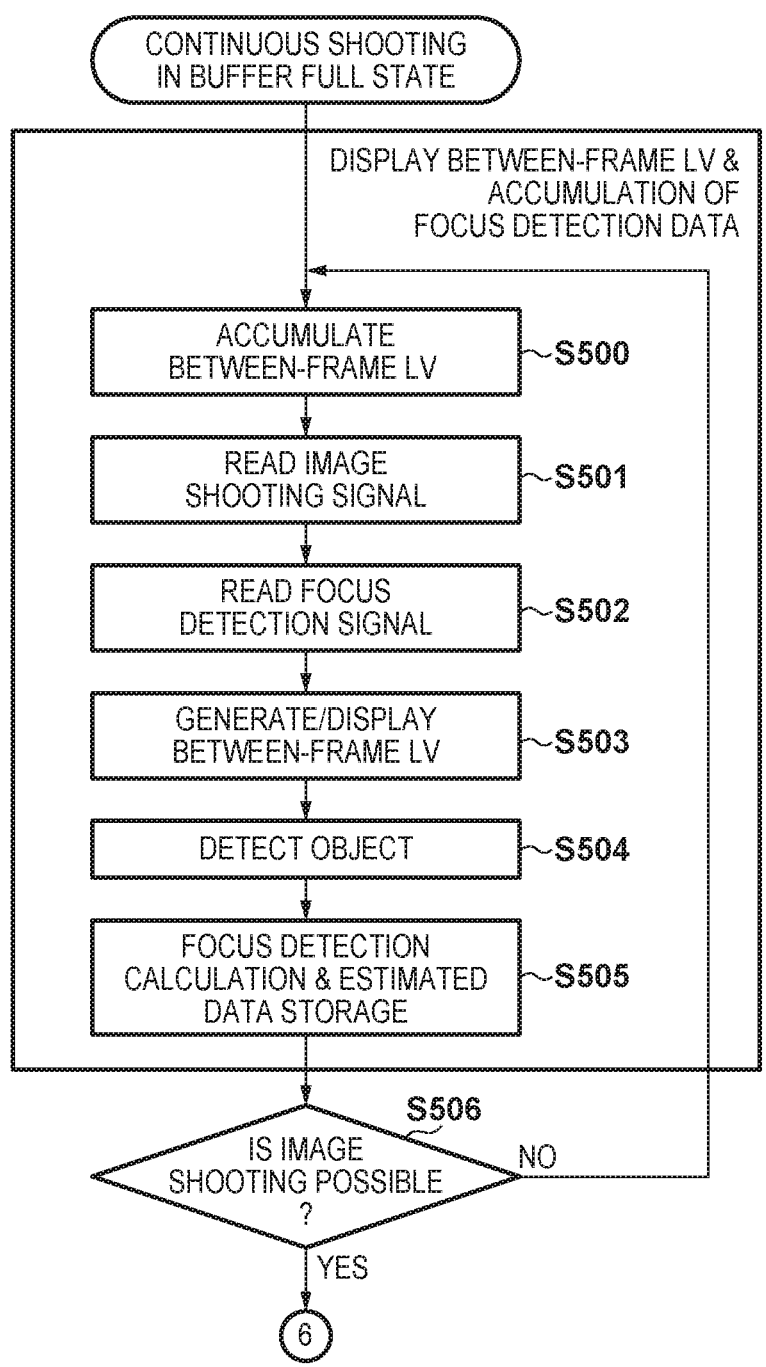
FIGS. 6A-6C are flowcharts illustrating a flow of continuous shooting in a buffer full state.
Figure 6B:
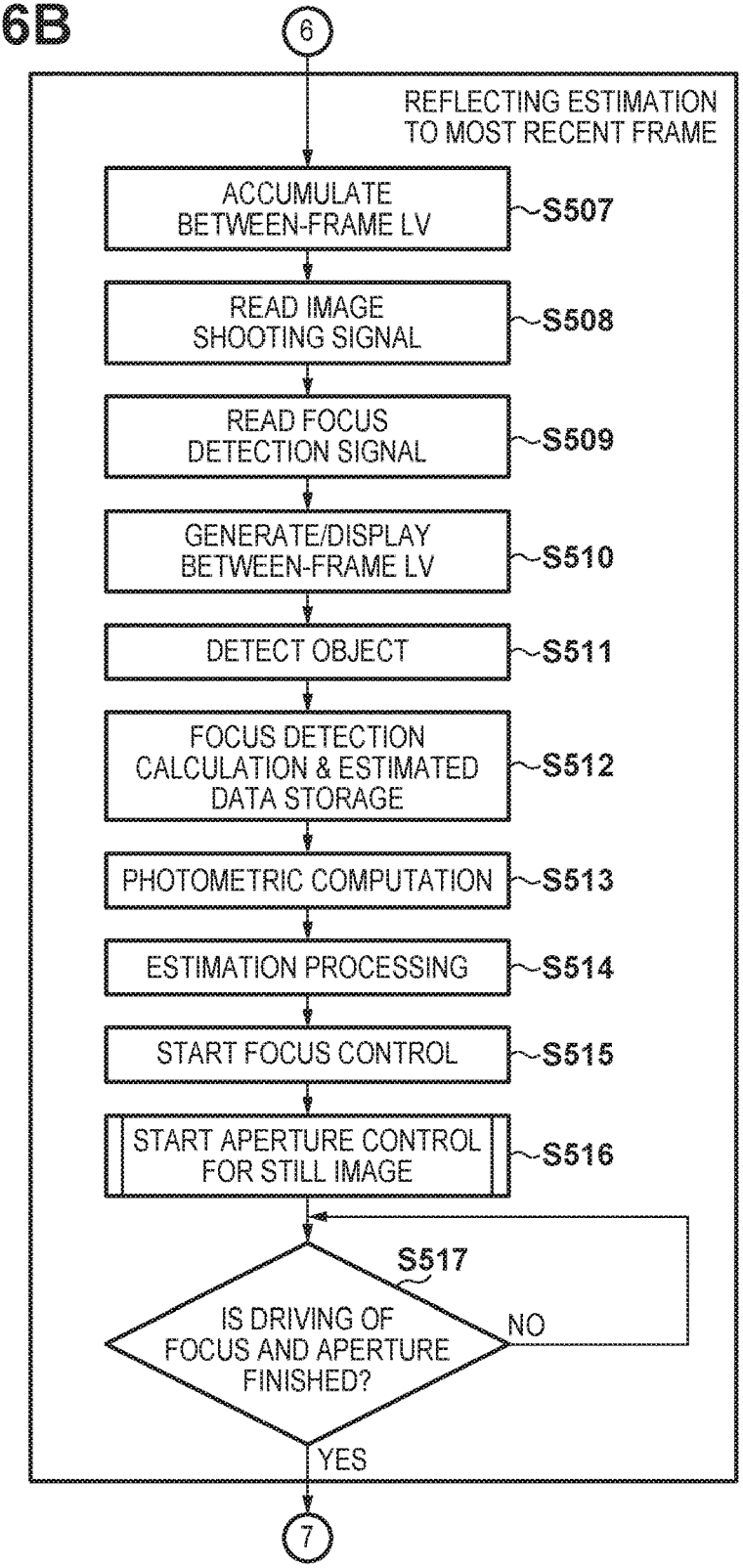
Figure 6C:
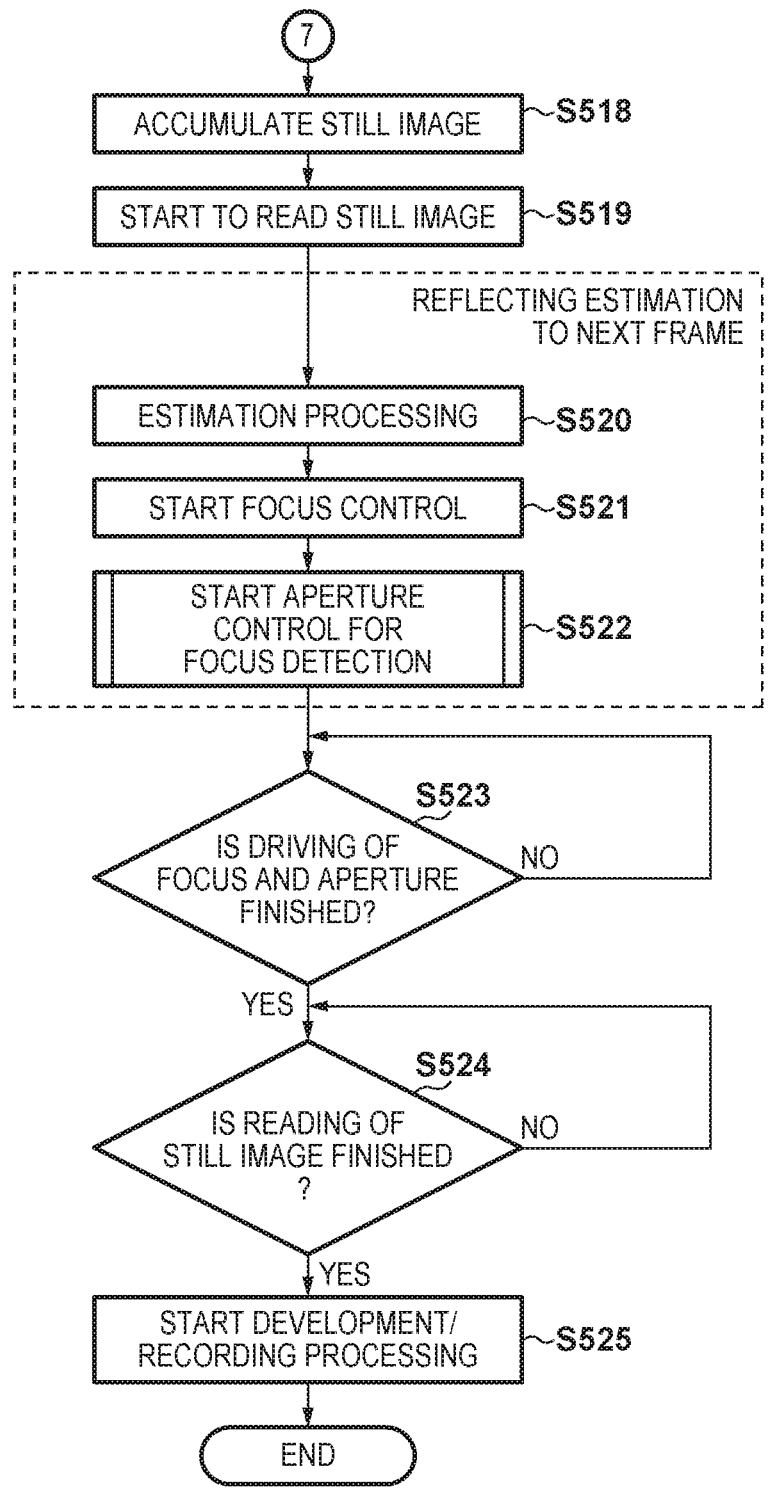

Next, FIG. 7 is used to give an explanation regarding a detailed operation example in a case where the flowcharts of FIGS. 6A-6C are executed in the present embodiment.

FIG. 7 illustrates an example where available space of the SDRAM 136 is insufficient at a point in time when still image shooting of an nth frame has ended, and illustrates a state where subsequent shooting waits until capacity necessary to temporarily store a subsequent image can be allocated, in accordance with writing to the recording medium 135. Shooting of the n+1th frame is performed when necessary capacity can be allocated in the SDRAM 136 after a certain time period has elapsed after waiting for subsequent shooting. In such a case, the time period elapses after shooting of the nth frame ends. During reading of the still image for the nth frame aperture control and focus control optimal to that point in time are performed, but because a time period has elapsed by shooting of the n+1th frame, it is possible that exposure and focus will greatly deviate if there is movement for the object that is the target of shooting.

Thus, the operation of the present embodiment is applied. In other words, as illustrated by the time period for waiting for memory space in FIG. 7, continuous between-frame LV images are displayed even in a time period where continuous shooting is interrupted. By this, a photographer can confirm an object, and it is possible to continue to perform focus detection in accordance with imaging plane phase difference AF based on an image signal obtained by accumulation of the between-frame LV. Therefore, it is possible to sequentially store a focus detection result necessary for estimation processing and an accumulation time that it is based on in the SDRAM 136. Accordingly, during a time period where continuous shooting is interrupted, it is possible to continue to acquire information for estimating movement of an object in that time period. At the point in time when necessary capacity in the SDRAM 136 can be allocated, it is possible to cause a focal point estimation result during the interruption of continuous shooting to be reflected in control of the focus lens 113 with respect to shooting of the n+1th frame. Therefore, it is possible to improve focus accuracy in still image shooting immediately after resuming continuous shooting. Recording speed to a recording medium is influenced for example by write speed to the recording medium itself, and not just by various capabilities of the image capturing apparatus. In this way, if it is possible to improve focus accuracy in still image shooting immediately after resuming continuous shooting, it is possible to reduce a decrease in focus accuracy even when using a recording medium having a slow write speed.

Detailed description of the present invention was given above based on illustrative embodiments, but the present invention is not limited to these specific embodiments, and it is possible to perform various modifications or alterations within the scope of the invention that is described in the claims.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-171298, filed Sep. 1, 2016, which is hereby incorporated by reference herein in its entirety.

What is claimed is:

1. An image capturing apparatus, comprising:
   an image sensor having a plurality of pixels;
   a focus detection unit configured to perform focus detection of an imaging optical system based on a focus detection signal obtained by the pixels;
   a continuous shooting unit configured to perform control to cause the image sensor to, a plurality of times, execute accumulation of an image signal for recording;
   a storage unit configured to store the image signal for recording;
   an estimation unit configured to estimate an in-focus position of an object at a time of acquiring the image signal for recording based on a result of the focus detection by the focus detection unit and information relating to an accumulation timing of the focus detection signal that is used in the focus detection; and
   a focus adjustment unit configured to control focus adjustment of the imaging optical system based on an estimation result by the estimation unit,
   wherein the image sensor performs accumulation of the focus detection signal in a time period in which the storage unit cannot store the image signal for recording,
   the focus detection unit performs the focus detection that uses the focus detection signal acquired in the time period, and
   the estimation unit estimates the in-focus position at the time of acquiring the image signal for recording that is acquired after the end of the time period based on the focus detection result that uses the focus detection signal acquired in the time period and the information relating to the accumulation timing of the focus detection signal used in the focus detection.

2. The image capturing apparatus according to claim 1, wherein in a case where the storage unit becomes able to resume storage of the image signal for recording, the focus adjustment unit causes a focal point of the imaging optical system to align with an in-focus position that is estimated by the estimation unit and that is for acquiring a first image signal for recording after the resumption.

3. The image capturing apparatus according to claim 1, further comprising a display unit configured to display an image that is based on a signal for display and that is acquired by the image sensor,
   wherein a signal for the focus detection is acquired at a time of accumulation of the signal for display.

4. The image capturing apparatus according to claim 3, wherein the signal for display is displayed between accumulations of the image signal for recording by the image sensor.

5. The image capturing apparatus according to claim 4, further comprising an object detection unit configured to detect an object by using the signal for display.

6. The image capturing apparatus according to claim 5, wherein the focus detection unit detects an in-focus position for the object detected by the object detection unit.

7. The image capturing apparatus according to claim 1, wherein the estimation unit estimates an in-focus position for acquiring a first image signal for recording after a resumption, based on an accumulation time of a signal for the focus detection and a result of a focus detection by the focus detection unit that uses the signal for the focus detection.

8. The image capturing apparatus according to claim 1, wherein the image sensor is configured by arrangement of a plurality of the pixels that each have one microlens and two photoelectric conversion elements.

9. The image capturing apparatus according to claim 8, wherein the focus detection unit performs focus detection of a phase difference detection method.

10. The image capturing apparatus according to claim 1, wherein the storage unit is a buffer memory configured to temporarily save an image signal for recording, and the time period in which the storage unit cannot store the image signal for recording is a time period in which the buffer memory is full.

11. The image capturing apparatus according to claim 1, further comprising a determination unit configured to determine whether the storage unit can store the image signal for recording.

12. The image capturing apparatus according to claim 1, wherein the focus detection unit repeats the focus detection while the time period continues.

13. The image capturing apparatus according to claim 12, wherein, if focus detection is performed a plurality of times during the time period, the estimation unit estimates an in-focus position by using the focus detection results of the plurality of times.

14. The image capturing apparatus according to claim 1, wherein the estimation unit estimates an in-focus position after the time period ends.

15. The image capturing apparatus according to claim 1, wherein the focus adjustment unit causes a focus lens to stop during the time period.

16. The image capturing apparatus according to claim 1, wherein the focus adjustment unit causes driving of a focus lens to stop upon receipt of notification of the end of the time period.

17. The image capturing apparatus according to claim 1, wherein the continuous shooting unit, when not in the time period, controls so that the image sensor periodically performs accumulation of the image signal for recording.

18. A method of control an image capturing apparatus provided with an image sensor having a plurality of pixels and a focus detection unit that performs focus detection of an imaging optical system based on a focus detection signal obtained in accordance with the pixels, the method comprising:
- performing control to cause the image sensor to, a plurality of times, execute accumulation of an image signal for recording;
- performing, during a time period in which saving of the image signal for recording cannot be performed, accumulation of the focus detection signal and the focus detection based on the focus detection signal;
- estimating an in-focus position of an object at a time of acquiring the image signal for recording, based on a result of the focus detection and information relating to an accumulation timing of the focus detection signal that is used in the focus detection,
- wherein the in-focus position at the time of acquiring the image signal for recording that is acquired after the end of the time period is estimated based on the focus detection result that uses the focus detection signal acquired in the time period and the information relating to the accumulation timing of the focus detection signal used in the focus detection.

19. A non-transitory storage medium storing a program for causing a computer to execute a method of controlling an image capturing apparatus provided with an image sensor having a plurality of pixels and a focus detection unit that performs focus detection of an imaging optical system based on a focus detection signal obtained in accordance with the pixels, the method comprising:
- performing control to cause the image sensor to, a plurality of times, execute accumulation of an image signal for recording;
- performing, during a time period in which saving of the image signal for recording cannot be performed, accumulation of the focus detection signal and the focus detection based on the focus detection signal;
- estimating an in-focus position of an object at a time of acquiring the image signal for recording, based on a result of the focus detection and information relating to an accumulation timing of the focus detection signal that is used in the focus detection,
- wherein the in-focus position at the time acquiring the image signal for recording that is acquired after the end of the time period is estimated based on the focus detection result that uses the focus detection signal acquired in the time period and the information relating to the accumulation timing of the focus detection signal used in the focus detection.

* * * * *